April 28, 1970    J. L. MARSHALL, JR., ET AL    3,508,432
SPINNERET CAPILLARY INSPECTION APPARATUS
Filed March 25, 1968

INVENTORS
JOHN L. MARSHALL, JR.
JOHN R. BRAY
BY
John W. Whisler
ATTORNEY

United States Patent Office 3,508,432
Patented Apr. 28, 1970

---

3,508,432
SPINNERET CAPILLARY INSPECTION APPARATUS
John L. Marshall, Jr., and John R. Bray, Pensacola, Fla., assignors to Monsanto Company, St. Louis, Mo., a corporation of Delaware
Filed Mar. 25, 1968, Ser. No. 715,880
Int. Cl. G01b 13/10
U.S. Cl. 73—37.8                10 Claims

ABSTRACT OF THE DISCLOSURE

A plurality of circuits, each having a first and second tubular conduit, are connected by the second tubular conduit to a plate. Each of the conduits has one end open to the atmosphere and the other end connected to a pressurized gas source. A fixed orifice is connected within each of the conduits near the pressurized gas source and an adjustable orifice is connected within the first conduit near the end opposite the pressurized gas source. A differential pressure gauge joins the conduits at a point intermediate the orifices of the first conduit and at a point intermediate the orifice and the plate of the second conduit. A spinneret is placed onto the plate and the capillaries of the spinneret are sealed to the second tubular conduit. A gas is admitted from the pressurized gas source and a reading is taken from the differential pressure gauge to determine if the spinneret will provide filaments of uniform linear dimensions.

BACKGROUND OF THE INVENTION

The apparatus of the invention provides for rapid inspection of spinnerets to determine the uniformity of capillary flow characteristics thereof from which an evaluation can be made to determine whether a spinneret is capable of fabricating yarn of uniform linear dimension.

In fabricating high quality yarn by means of melt-spinning operations, wherein molten polymer is extruded through minute spinneret capillaries into filaments, the capillaries must have uniform flow characteristics if the yarn is to be of uniform linear dimension. Uniform linear dimension of yarn is necessary in order to provide yarn of uniform physical properties along its length. Capillary flow characteristics in melt-spinning operations is a function of capillary dimensions, i.e. capillary length and cross-sectional dimensions.

In the past, inspection of spinnerets to determine uniformity of spinneret capillary flow characteristics has been accomplished by physical measurement of capillary dimensions with the aid of microscopes. This method is very time consuming and therefore expensive since a spinneret may have 560 or more capillaries which have relatively small dimensions, e.g. a diameter and length of 9 mils and 12 mils, respectively. Moreover, the capillaries may be of irregular cross-section, such as polylobal-shaped, which are difficult and tedious to measure, especially when each dimension is measured to ±0.1 mil accuracy. Even under the most favorable conditions the physical measurement inspection technique may be unreliable due to accuracy limitations in optical equipment, human error and variations in eyesight among operators, and because of the effect of capillary wall finish that is difficult to evaluate by optical methods.

SUMMARY OF THE INVENTION

The apparatus of the present invention provides means for a quick and reliable inspection of the uniformity of flow characteristics of capillaries within a spinneret and among a plurality of spinnerets. This uniformity as determined by the apparatus is particularly sensitive to differences in diameter and wall roughness among capillaries.

The apparatus having a plurality of fluid systems or circuits, preferably one for each capillary of a given spinneret, simultaneously measures the flow characteristics of capillaries within a spinneret by means of gauges, one associated with each circuit, which are preferably arranged in a panel. Differences in gauge readings indicate differences in capillary flow characteristics.

In general, the apparatus comprises a plurality of identical fluid systems or circuits, preferably one for each capillary of the spinneret being inspected. Each circuit has two tubular conduits. One end of each conduit is opened to the atmosphere and the other end thereof is connected to a pressurized air source. Non-adjustable orifices are positioned within each conduit near said source. An adjustable orifice is positioned within one conduit near the end thereof opened to the atmosphere; the corresponding end of the other conduit is connected to a capillary of the spinneret. A differential pressure gauge joins each conduit at a point intermediate the orifices thereof, the capillary being considered an orifice, and indicates the difference in pressure between the two conduits. Before inspection of a spinneret each circuit is calibrated by adjusting the adjustable orifice to a position so that when pressurized air is passed through the circuit and the circuit is connected to a capillary which has dimensions corresponding to dimensions specified therefor by the spinneret manufacturers, the gauge will indicate zero output. Since the capillary is the only orifice of unknown restriction within the circuit, the gauge reading is indicating the flow characterstics thereof, i.e. the capillary is the sole factor responsible for pressure differentials between the two conduits. Since the pressure within the conduit connected to the capillary is an inverse function of the cross-sectional area of the capillary, the gauge may be calibrated to indicate directly the diameter of the capillary. Additionally, the gauge scale may be calibrated to indicate capillary diameter values which are considered to be unacceptable for spinning yarn of uniform linear dimension, i.e. values which are "out of limits."

The circuits may be connected directly to the respective capillaries of the spinneret being inspected or indirectly thereto via a mounting means onto which the spinneret is then mounted by any suitable clamping means. The mounting means may be a plate having a shape corresponding to that of the spinneret and having a plurality of holes extending therethrough of predetermined cross-sectional dimension and arrangement so that, when a spinneret is mounted onto the plate, the spinneret capillaries and plate holes are aligned forming tubular passageways; the plate holes, preferably, are each concentrically positioned within rubber O-rings to seal the passageways intermediate the ends thereof from the atmosphere. The conduit end is sealingly connected to the plate concentric to the plate hole. The plate may be permanently attached to the conduit or, preferably, it may be removable therefrom. Since the size and pattern of capillaries within a spinneret differ from spinneret type to spinneret type, the flexibility of the apparatus is greatly enhanced by providing interchangeable plates, one for each type of spinneret. The manner in which the conduit is sealingly connected to the plate or to a capillary may be accomplished by any conventional means recognized in the art, e.g. coupling means.

The differential pressure gauge may be any suitable gauge of this type. A preferred gauge is a U-type manometer containing a liquid such as water, oil, alcohol, etc.

DESCRIPTION OF THE PREFERRED EMBODIMENTS

Inspection of the uniformity of spinneret capillary flow characteristics is preferably carried out using air as the fluid supplied to the circuits of the apparatus. Spinnerets used for purposes of illustrating the apparatus and use thereof have the following specifications: circular capillaries measuring 9 x 12 mils (diameter and length), although any type of spinneret could have been selected.

Figure 1:
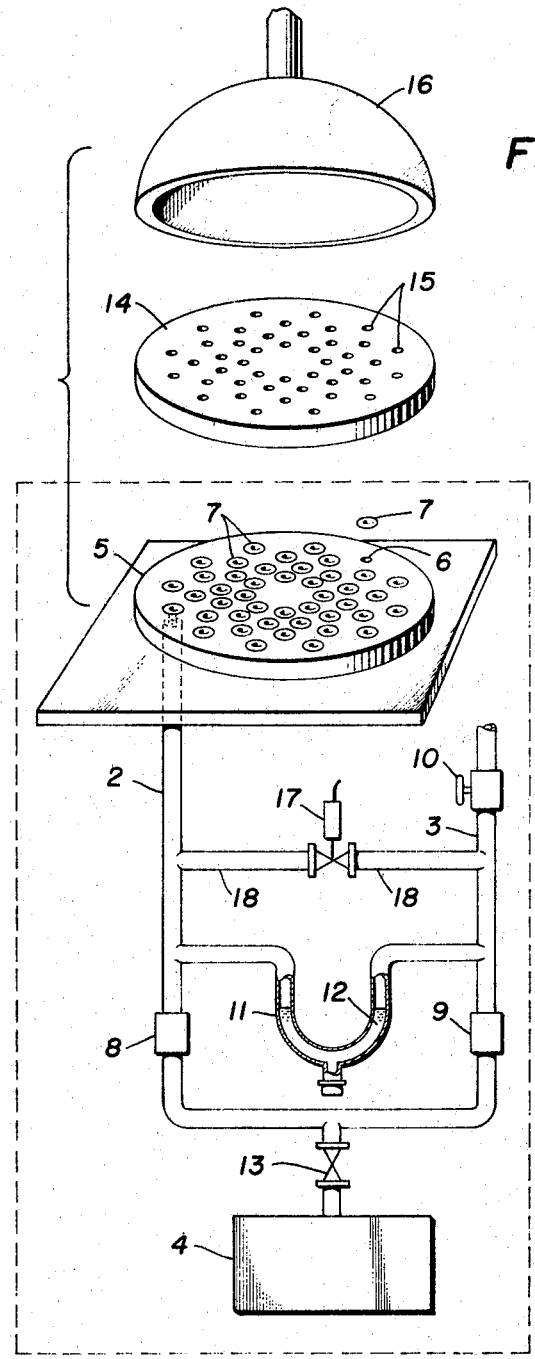
FIGURE 1 is a schematic perspective view of an apparatus of the present invention, parts removed.
Figure 2:
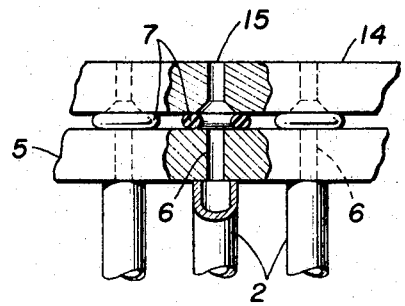
FIGURE 2 is a schematic perspective view showing the mounting plate and fluid circuit tie-in, parts removed.
Figure 3:
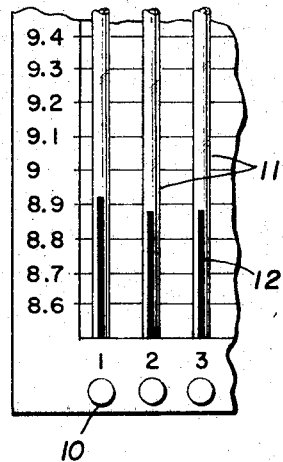
FIGURE 3 is a schematic perspective view showing a preferred arrangement of indicators, parts removed.

FIGURE 1 illustrates an apparatus of the present invention designated in the figure as 1. Apparatus 1 has conduits 2 and 3, each having one end connected to pressurized air source 4 and the opposite end opened to the atmosphere. For ease of illustration FIGURE 1 shows only one pair of conduits 2 and 3, however, preferably, there is a pair of said conduits for each capillary of the spinneret being inspected. The end of conduit 2 opposite source 4 is connected to mounting means 5, shown in FIGURE 1 as a plate. Plate 5 has a plurality of holes 6, preferably, corresponding in number to the number of capillaries within the spinneret being inspected, extending therethrough of predetermined spacing and size positioned concentrically within rubber O-rings 7. Conduit 2 is connected to plate 5 so that the conduit passageway and a hole 6 are aligned and sealed from the atmosphere. Fixed orifices 8 and 9 are placed within conduits 2 and 3 near air source 4. An adjustable orifice 10 is positioned within conduit 3 near the end thereof opposite source 4. A differential pressure gauge shown in FIGURE 1 as a U-type manometer 11 containing liquid 12 joins conduit 2 and conduit 3 as shown in the figure. Valve 13 controls the flow of air from air source 4 and is adjusted to admit air at 5 p.s.i.g. into conduits 2 and 3. At this time solenoid valve 17 positioned within conduit 18 which joins conduits 2 and 3 is open to equalize the pressure within conduits 2 and 3. The solenoid valves thus, when in the open position, permit air passing through the circuits to by-pass manometers 11. To inspect spinneret 14 having a plurality of capillaries 15, spinneret 14 is positioned onto plate 5 so that each capillary 15 is aligned with a hole 6. This may be done, for example, visually or by means of guides, such as by aligning marks on the spinneret and plate. Sealing and clamping means, shown in FIGURE 1 as a hydraulic foot 16, is actuated causing it to contact the outer rim of spinneret 14 forcing spinneret 14 against rubber O-rings 7 to seal holes 6 and capillaries 15 from the atmosphere at the interface of rings 7 and spinneret 14 as shown in FIGURE 2. Any other suitable means may be employed in place of hydraulic foot 16, if desired. With spinneret 14 properly positioned and secured on plate 5, solenoid valve 17 is closed, whereby any pressure differential between conduits 2 and 3 will now be indicated by manometer 11. Adjustable orifice 10 has previously been adjusted to correspond in restriction to specification capillary 15 dimensions. Air passes through conduit 2 into the atmosphere via orifice 8 and capillary 15 and through conduit 3 into the atmosphere via orifices 9 and 10, respectively. If capillary 15 corresponds in restriction to orifice 10, manometer 11 will read zero output indicating the pressure within conduits 2 and 3 is the same. Changes in capillary restriction will result in a difference in pressure between conduits 2 and 3 which will be indicated by manometer 11. Manometers 11 are calibrated as shown in FIGURE 3 to read directly in terms of relative diameter; relative diameter is defined as the diameter required to obtain a given pressure differential reading on the gauge assuming a given capillary length. Relative diameter values are very useful and meaningful in comparing the flow characteristics of capillaries within a spinneret since each of these values is a measure of total fluid flow through the respective capillary. Therefore, a comparison of all of these values is representative of the uniformity of capillary flow characteristics within that spinneret, particularly as influenced by capillary diameter and wall roughness. A difference among the capillaries within a spinneret of ±0.1 mil relative diameter is presently considered to be unacceptable for purposes of fabricating yarn of uniform linear dimensions. A difference of ±0.2 mil between capillaries of different spinnerets is likewise considered unacceptable. By arranging all the manometers in a suitable manner, such as the arrangement shown in FIGURE 3, an operator can determine at a glance the uniformity of capillary flow characteristics and whether all the capillaries are within acceptable limits.

Each manometer is preferably identifiable with a particular capillary of the spinneret. In this manner if a capillary gives a manometer reading out-of-limits, the capillary can subsequently be examined critically under a microscope to determine if the capillary can be readily repaired and brought into limits. Occasionally, foreign particles which can easily be removed accumulate in the capillary causing an out-of-limits reading. Also, the capillary can be drilled to a larger diameter or it can be plugged and redrilled to a smaller diameter.

The apparatus shown in FIGURE 1 is merely for purposes of illustrating the invention. The invention however is intended to include any apparatus of this type including obvious refinements and modifications thereof. Thus, to adapt to spinnerets having different numbers and patterns of capillaries, the apparatus may have, for example, 70 pneumatic circuits, some or all of which, can be deactivated by means of solenoid valves which cause the air to by-pass the manometers when a particular circuit is not required for inspection. Different sizes and types of manometers may be incorporated into the apparatus in place of the type described above, for example, inclined manometers.

The sensitivity of the apparatus depends on the size of orifices within the conduits; the differential pressure gauge employed and its design, e.g., the density of the manometer liquid; the density and viscosity of the fluid supplied to the units, as well as environmental conditions, such as temperature and humidity. To obtain manometer readings which are reliable and descriptive of capillary flow characteristics, the apparatus should be kept and operated in an area maintained at relatively constant temperature and humidity. The sensitivity of the apparatus can be easily controlled by varying the air supply pressure. The pressure, however, should never be great enough to result in air passing through the units at sonic velocities, since at sonic velocities, the pressure differential indicated by the manometer becomes insensitive to changes in orifice cross-section. Suitable pressures are from just above atmospheric to about 20 p.s.i.g. Preferably the pressure is from 5 to 10 p.s.i.g.

CALIBRATION OF THE APPARATUS

Before a spineret of a given type can be inspected, the apparatus must be checked to be certain it is adjusted and calibrated for spinnerets of the given type. The apparatus is calibrated by adjusting orifice 10 of each circuit to the same restriction as the capillary specifications of the spinnerets to be inspected. This may be accomplished as follows: a spinneret of the type to be inspected is selected at random and one of its capillaries is selected, after inspection with a microscope, to be as near capillary specification as can be measured. A single-position pneumatic circuit, corresponding in design and operation to the apparatus circuits, is used to inspect and record all the flow characteristics of each capillary of the spinneret, the gauge first being balanced to zero output on the selected capillary by means of adjustable orifice 10. Zero output describes the condition in which the pressure between the orifices in conduit 2 is the same as between the orifices in conduit 3, thereby indicating a differential pressure reading of zero. From the recordings a calibration chart is prepared. A calibration spinneret and chart is kept for each type spinneret. Thereafter, the apparatus is calibrated by installing the calibration spinneret in the apparatus and adjusting orifice 10 of each unit with the aid of the chart to provide zero output for the capillary specifications of the spinneret to be inspected.

EXAMPLE 1

With an apparatus substantially as shown in FIGURE 1 and having 68 circuits, a spinneret having 68 capillaries of circular cross-section and capillary specifications of 9 mil diameter and 12 mil length was inspected to determine the uniformity of capillary flow characteristics thereof. The total inspection time of the spinneret after calibration of the apparatus was approximately 3 minutes. Inspection of the same spinneret by the physical measurement method required about 2½ hours.

The apparatus may be used effectively to inspect spinnerets having a large number of capillaries, for example 280, 560, etc., by increasing the number of measuring units to accommodate the spinneret. However, mounting plates may be constructed which permit examination of all the capillaries by means of fewer measuring units than spinneret capillaries. For example, a spinneret havinging 280 holes arranged in a pattern defining concentric circles may be examined on an apparatus having 70 units by providing a mounting plate having 70 holes so arranged in a pattern that by rotating the spineret through one revolution while the spinneret and mounting plate are superimposed, all the capillaries of the spinneret are coincident with at least one of the plate openings at some point during the revolution. Thus, with the proper mounting plate all the capillaries of almost any spinneret can be examined by taking a reading; rotating the spinneret through a determined angle, shifting the spinneret or the like; taking another reading and repeating the procedure a number of times. Ideally, when using a 70-hole plate to inspect a 280-capillary spinneret having the capillaries spaced in a pattern defining concentric circles, the spinneret would be rotated 90° to each of four separate positions.

EXAMPLE II

With an apparatus substantially the same as that employed in Example I with the exception that the apparatus had 70 circuits, a 280-hole spinneret having capillary specifications of 9 mil diameter and 12 mil length was inspected to determine the uniformity of capillary flow characteristics among the capillaries thereof. A mounting plate was employed which permitted the inspection to be accomplished by taking four readings wherein the spinneret was rotated through a 90° angle after the first three readings in the manner described herein. The inspection, not including calibration, required 4 minutes, as compared to 8½ hours employing physical measurement methods. Two capillaries indicated to be undersized by the respective manometers (indicated pressure drop higher than specified by calibration) were examined carefully at 50× magnification with a measuring microscope. Both the measured diameters and lengths of the capillaries were within specifications; however, by tilting of the spineret and manipulation of the substage lighting a small burr of metal at the inlet end of one capillary and a raised zone along a portion of the interior wall of the other capillary was revealed. Each of these defects were readily correctable by broaching but would not have been discovered by routine microscopic examination. Ordinarily, these defective capillaries would not have been found until after the spinneret had actually been installed in the spinning machine and been observed to be producing undersize filaments.

Thus far the apparatus has been operated using air as the fluid passed through the units, primarily because it is economical and easily handled. However, other fluids could be effectively used however, for example, nitrogen or liquids, such as oils. Although liquids have flow characteristics more closely related to the flow characteristics of molten polymers, liquids are messy to use and require recovery. Moreover, the gain in information attained by using liquids rather than air is greatly outweighed by the disadvantages, especially when the apparatus is employed as an inspection apparatus to determine flow differences between capillaries instead of absolute dimensions of capillaries. Liquids are useful with the apparatus however to study, for example, flow characteristics with respect to capillary design.

What is claimed is:

1. An apparatus for quickly and reliably determining whether a spinneret having a plurality of capillaries passing therethrough will provide filaments of uniform linear dimensions comprising in combination:
   (A) a plurality of circuits, each comprising a first and second tubular conduit, each of said conduits having one end thereof open to the atmosphere and the other end thereof connected to a pressurized gas source;
   (B) a fixed orifice spaced within each of said conduits near said source;
   (C) an adjustable orifice spaced within said first conduit near the end thereof opposite said source;
   (D) a differential pressure gauge joining said conduits from a point intermediate the orifices of said first conduit to a point intermediate the orifice and end remote thereto of said second conduit; and
   (E) means for concentrically and sealingly connecting said remote end of each of said second conduit to a capillary of said spinneret, whereby each said capillary is connected at most to a single said second conduit.

2. The apparatus of claim 1 wherein the pressurized gas source is a pressurized air source.

3. The apparatus of claim 2 wherein each of the fixed orifices has a restriction substantially corresponding to the restriction of a specification capillary of said plate.

4. The apparatus of claim 2 wherein said gauge is a differential manometer.

5. The apparatus of claim 2 wherein said means for connecting said conduit to a said capillary comprises an adapter plate positioned between said plate and said second conduit having a plurality of holes extending therethrough which align with said capillaries and are sealingly connected to said second conduit.

6. A method of quickly and reliably determining whether a spinneret will provide filaments of uniform linear dimensions which comprises:
   (A) placing a spinneret onto a plate, said plate having passages geometrically arranged in the same manner as the capillaries of said spinneret;
   (B) aligning said capillaries and said passages;
   (C) sealing said spinneret to said plate;
   (D) admitting a gas from a pressurized source through a plurality of circuits wherein each circuit comprises
      (1) a first and second tubular conduit characterized in that each conduit has one end thereof open to the atmosphere and the other end thereof connected to said pressurized source; said first conduit being further characterized in that each conduit contains an orifice of known restriction near each end thereof; said second conduit being further characterized in that each conduit contains an orifice of known restriction near said source and that the conduit end opposite said source is connected to a passage of said plate; and (2) a differential pressure gauge joining said conduits from a point intermediate the orifices of said first conduit to a point intermediate the orifices and end remote thereto of said second conduit;

(E) comparing the readings of said gauges to determine if said spinneret will provide filaments of uniform linear dimensions.

7. The method of claim 6 wherein the gauges are differential manometers.

8. The method of claim 7 wherein the air is admitted into each conduit at 5 p.s.i.g.

9. The method of claim 7 wherein the manometers are calibrated to indicate the diameters of said capillaries.

10. The method of claim 9 wherein the manometers are arranged serially in a panel.

References Cited

UNITED STATES PATENTS

| 2,589,251 | 3/1952 | Heinz | 73—37.5 |
| 2,924,965 | 2/1960 | Westerheim | 73—40 |
| 3,119,733 | 1/1964 | Wilson et al. | 73—3 X |
| 3,125,879 | 3/1964 | Porter | 73—3 |
| 3,201,985 | 8/1965 | Williams | 73—37.7 X |
| 3,271,997 | 9/1966 | Horne et al. | 73—37.7 |
| 3,395,575 | 8/1968 | Emerson | 73—168 X |

FOREIGN PATENTS 1,029,657   5/1966   Great Britain.

LOUIS R. PRINCE, Primary Examiner

H. C. POST III, Assistant Examiner

U.S. Cl. X.R.

73—3